(12) United States Patent
Abe

(10) Patent No.: US 11,227,480 B2
(45) Date of Patent: Jan. 18, 2022

(54) VEHICLE INTERIOR MONITORING DEVICE AND VEHICLE INTERIOR MONITORING METHOD

(71) Applicant: Mitsubishi Electric Corporation, Tokyo (JP)

(72) Inventor: Kazunori Abe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/959,538

(22) PCT Filed: Jan. 31, 2018

(86) PCT No.: PCT/JP2018/003216
§ 371 (c)(1),
(2) Date: Jul. 1, 2020

(87) PCT Pub. No.: WO2019/150488
PCT Pub. Date: Aug. 8, 2019

(65) Prior Publication Data
US 2021/0074144 A1    Mar. 11, 2021

(51) Int. Cl.
*G08B 21/24* (2006.01)
*G06K 9/00* (2006.01)
*G08B 21/22* (2006.01)

(52) U.S. Cl.
CPC ......... *G08B 21/24* (2013.01); *G06K 9/00201* (2013.01); *G06K 9/00369* (2013.01); *G06K 9/00838* (2013.01); *G08B 21/22* (2013.01)

(58) Field of Classification Search
CPC ........... G06K 9/00832; G06K 9/00624; G06K 9/00362; G06K 9/00201; G06K 9/00369;
(Continued)

(56) References Cited

U.S. PATENT DOCUMENTS 6,323,761 B1 * 11/2001 Son ...................... B60R 25/10
340/426.35
6,820,897 B2 * 11/2004 Breed .................. B60R 21/015
280/735
(Continued)

FOREIGN PATENT DOCUMENTS

DE    102014213531 A1    1/2016
DE    102017105243 A1    9/2017
(Continued)

OTHER PUBLICATIONS

German Office Action of German Patent Application No. 112018006598.7 dated May 6, 2021 with English translation.

*Primary Examiner* — Daniel Previl
(74) *Attorney, Agent, or Firm* — Birch, Stewart, Kolasch & Birch, LLP

(57) ABSTRACT

An object owner determining unit generates object owner information by determining an owner of an identified object identified by an object identification unit, out of the occupants identified by an occupant identification unit, using occupant identification information and object identification information. When getting out of an occupant is detected by the occupant identification unit, an object misplacement determining unit determines whether or not an object owned by the occupant who gets out is misplaced in the vehicle using the object owner information about the occupant who gets out. When the object misplacement determining unit determines that an object owned by the occupant who gets out is misplaced in the vehicle, the warning unit provides a warning.

8 Claims, 16 Drawing Sheets

(58) Field of Classification Search
CPC ............ G06K 9/00838; B60R 21/0152; B60R 21/0153; B60R 21/01542; B60R 2001/1253; B60R 2021/0027; B60R 2021/23153; B60R 2021/26094; B60R 2021/2765; B60R 2022/208; B60R 2022/288; B60R 2022/4685; B60R 2022/4825; B60R 21/013; B60R 21/0132; B60R 21/01538; B60R 21/01544; B60R 21/01546; B60R 21/21656; B60R 21/276; B60R 22/20; B60R 22/201; B60R 25/252; B60R 25/255; B60R 25/257; B60R 21/01516; B60R 21/01534; B60R 21/01536; B60R 16/037; B60R 2001/1223; B60R 21/0134; B60R 21/0136; B60R 21/015; B60R 21/01532; B60R 21/01548; B60R 21/01552; B60R 21/01554; B60R 21/203; B60R 25/25; B60N 2/002; B60N 2002/0268; B60N 2002/0272; B60N 2/015; B60N 2/0232; B60N 2/0244; B60N 2/0248; B60N 2/0252; B60N 2/0276; B60N 2/067; B60N 2/28; B60N 2/2806; B60N 2/2863; B60N 2/66; B60N 2/829; B60N 2/853; B60N 2/888; G01S 13/04; G01S 15/04; G01S 15/06; G01S 15/87; G01S 15/88; G01S 17/88; G01S 17/89; G01S 7/417; G01S 7/4802; G01S 7/539; G01S 15/42; G01S 17/04; G08B 21/24; G08B 13/1427; G08B 13/248; G08B 21/0286; G08B 29/181; G08B 13/196; G08B 21/22; G08B 3/10; B60C 11/24; B60C 19/00; B60Q 1/143; B60Q 2300/41; B60Q 2300/42; B60Q 9/00; E05F 15/43; E05F 15/431; E05F 2015/433; E05Y 2900/516; E05Y 2900/542; E05Y 2900/55; G06F 3/0219; G06F 3/0233; G06F 3/0237; G06F 3/0238; G07C 5/008; G07C 5/0808; G10K 2210/1282; G10K 2210/3219; H01Q 1/3291; H04W 4/80; H04W 88/02
USPC .......... 340/457, 458, 461, 506, 525, 539.22, 340/568.1, 571, 7.55, 10.42
See application file for complete search history.

(56) References Cited

U.S. PATENT DOCUMENTS

| | | | |
|---|---|---|---|
| 2012/0197522 A1* | 8/2012 | Fukuhara | G01C 21/3484 |
| | | | 701/424 |
| 2017/0036599 A1* | 2/2017 | Siddiqui | H04N 5/23293 |
| 2017/0098364 A1 | 4/2017 | Jaegal | |
| 2017/0174229 A1* | 6/2017 | Mueller | G05D 1/0061 |
| 2019/0057264 A1* | 2/2019 | Schmidt | G05D 1/0061 |

FOREIGN PATENT DOCUMENTS

| | | |
|---|---|---|
| DE | 102016215524 A1 | 3/2018 |
| JP | 2005-47343 A | 2/2005 |
| JP | 2010-182189 A | 8/2010 |

* cited by examiner

FIG. 3

| Component | Definition of Component |
|---|---|
| Occupant Image | Image Data About Occupant |
| Occupant ID | Specific Identifier Assigned to Occupant Having Got in |
| Getting in/out State | "Getting in","Getting out" |
| Seat Position | "Driver","Front","Rear Right","Rear Left", "Rear Center","Undetermined" |

FIG. 5

| Component | Definition of Component |
|---|---|
| Object Image | Image Data About Object |
| Object ID | Specific Identifier Assigned to Carried-in Object |
| Carry-in State | "Carrying in","Carrying out" |
| Location | "Driver's Seat","Front Seat","Rear Right Seat", "Rear Left Seat","Rear Center Seat","Center Console", "Driver's Seat Door Pocket","Front Seat Door Pocket", "Rear Left Seat Door Pocket","Rear Right Seat Door Pocket", "Undetermined Carry-in Position" |

FIG. 7

| Component | Definition of Component |
|---|---|
| Object Image | Image Data About Object |
| Object ID | Specific Identifier Assigned to Carried-in Object |
| Carry-in State | "Carrying in","Carrying out" |
| Location | "Driver's Seat","Front Seat","Rear Right Seat", "Rear Left Seat","Rear Center Seat","Center Console", "Driver's Seat Door Pocket","Front Seat Door Pocket", "Rear Left Seat Door Pocket","Rear Right Seat Door Pocket", "Undetermined Carry-in Position" |
| Owner Image | Image Data About Owner |
| Owner ID | ID of Occupant Owning Object |
| Getting in/out State | "Getting in","Getting out" |
| Seat Position | "Driver","Front","Rear Right","Rear Left","Rear Center", "Undetermined" |

FIG. 8

| Location in Object Identification Information | Seat Position Priority of Occupant Having High Possibility of Being Owner in Occupant Identification Information |
|---|---|
| Driver's Seat | Driver's Seat |
| Front Seat | Front Seat>Driver's Seat |
| Rear Right Seat | Rear Right Seat>Rear Center Seat>Rear Left Seat >Driver's Seat |
| Rear Left Seat | Rear Left Seat>Rear Center Seat>Rear Right Seat >Front Seat>Driver's Seat |
| Rear Center Seat | Rear Center Seat>Rear Left Seat>Rear Right Seat >Driver's Seat |
| Center Console | Driver's Seat |
| Driver's Seat Door Pocket | Driver's Seat |
| Front Seat Door Pocket | Front Seat >Driver's Seat |
| Rear Right Seat Door Pocket | Rear Right Seat>Driver's Seat |
| Rear Left Seat Door Pocket | Rear Left Seat>Driver's Seat |

FIG. 17

| Component | Definition of Component |
|---|---|
| Occupant Image | Image Data About Occupant |
| Occupant ID | Specific Identifier Assigned to Occupant Having Got in |
| Getting in/out State | "Getting in","Getting out" |
| Seat Position | [x, y, z] Coordinate Values |

FIG. 18

| Component | Definition of Component |
|---|---|
| Object Image | Image Data About Object |
| Object ID | Specific Identifier Assigned to Carried-in Object |
| Carry-in State | "Carrying in","Carrying out" |
| Location | [x, y, z] Coordinate Values |

FIG. 19

| Component | Definition of Component |
|---|---|
| Object Image | Image Data About Object |
| Object ID | Specific Identifier Assigned to Carried-in Object |
| Carry-in State | "Carrying in","Carrying out" |
| Location | [x, y, z] Coordinate Values |
| Owner Image | Image Data About Owner |
| Owner ID | ID of Occupant Owning Object |
| Getting in/out State | "Getting in","Getting out" |
| Seat Position | [x, y, z] Coordinate Values |

VEHICLE INTERIOR MONITORING DEVICE AND VEHICLE INTERIOR MONITORING METHOD

TECHNICAL FIELD

The present disclosure relates to a vehicle interior monitoring device for and a vehicle interior monitoring method of monitoring the misplacing of an object.

BACKGROUND ART

In the invention according to Patent Literature 1, an occupant acquires a captured image of the cabin of a vehicle from a vehicle control device by operating a terminal when realizing that he or she misplaced an object in the vehicle after leaving the vehicle. When a misplaced object is captured in the image, the occupant instructs the vehicle control device to conceal the misplaced object via the terminal. The vehicle control device conceals the misplaced object by controlling, for example, the states of seats in accordance with this instruction, thereby preventing theft.

CITATION LIST

Patent Literature

Patent Literature 1: JP 2005-47343 A

SUMMARY OF INVENTION

Technical Problem

In the invention according to Patent Literature 1, when an occupant realizes that he or she misplaced something in the vehicle, the misplaced object is concealed only after the occupant performs an operation of providing a concealing instruction. However, there is a problem in this technique that, the misplacing itself cannot be prevented.

The present disclosure is made in order to solve the above problem, and it is therefore an object of the present disclosure to prevent the misplacing of an object.

Solution to Problem

A vehicle interior monitoring device according to the present disclosure includes: a captured image acquiring unit to acquire a captured image that is generated by capturing an image of an interior of a vehicle; an occupant identification unit to detect getting in and getting out of a vehicle of each of occupants using the captured image acquired by the captured image acquiring unit, and generate occupant identification information by identifying each of the occupants who has got in as an identified occupant; an object identification unit to detect presence or absence of an object using the captured image acquired by the captured image acquiring unit, and generate object identification information by identify an object detected to be present as an identified object; an object owner determining unit to generate object owner information by determining an owner of the identified object identified by the object identification unit, out of the occupants identified by the occupant identification unit, using the occupant identification information and the object identification information; an object misplacement determining unit to determine, when getting out of an occupant is detected by the occupant identification unit, whether or not an object owned by the occupant who gets out is misplaced in the vehicle using the object owner information about the occupant who gets out; and a warning unit to provide a warning when the object misplacement determining unit determines that an object owned by the occupant who gets out is misplaced in the vehicle.

Advantageous Effects of Invention

According to the present disclosure, because an occupant who is the owner of an object is determined, and, when the occupant gets out of a vehicle, whether or not the object owned by the occupant is misplaced in the vehicle is determined and a warning is provided, misplacing of an object can be prevented.

BRIEF DESCRIPTION OF DRAWINGS

FIG. 3 is a view showing an example of occupant identification information in Embodiment 1;

FIG. 5 is a view showing an example of object identification information in Embodiment 1;

FIG. 7 is a view showing an example of object owner information in Embodiment 1;

FIG. 8 is a view showing an example of information in Embodiment 1 in which a relation between the location of an object specified by object identification information and a priority of a seat position of an occupant, specified by an occupant identification information, having a high possibility of being an owner of the object, is defined;

FIG. 17 is a view showing an example of occupant identification information in Embodiment 3;

FIG. 18 is a view showing an example of object identification information in Embodiment 3;

FIG. 19 is a view showing an example of object owner information in Embodiment 3;

DESCRIPTION OF EMBODIMENTS

Hereinafter, in order to explain the present disclosure in greater detail, embodiments of the present disclosure will be described with reference to the accompanying drawings.

Embodiment 1

Figure 1:
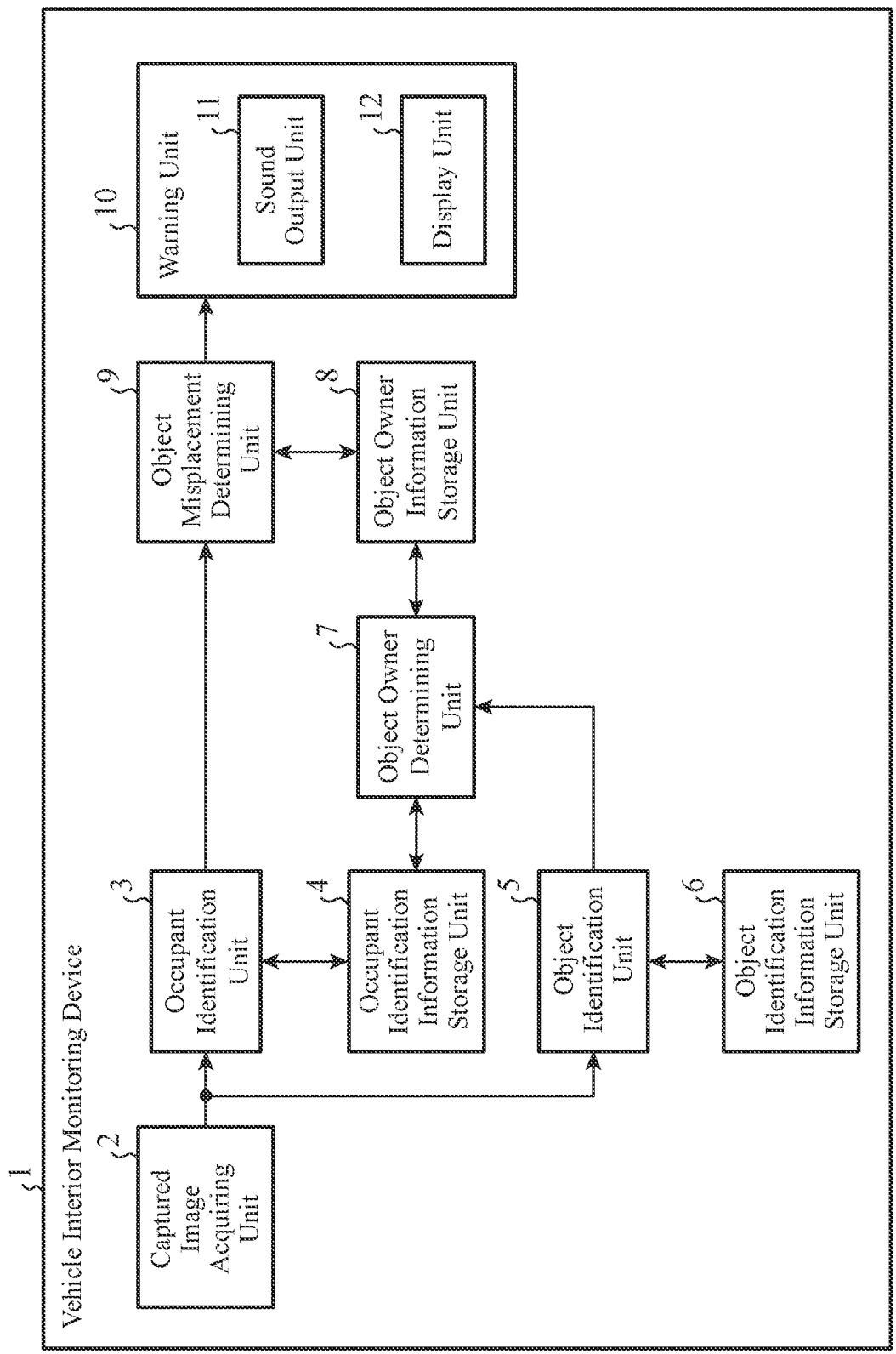
FIG. 1 is a block diagram showing an example of a configuration of a vehicle interior monitoring device according to Embodiment 1.

FIG. 1 is a block diagram showing an example of the configuration of a vehicle interior monitoring device 1 according to Embodiment 1. The vehicle interior monitoring device 1 includes a captured image acquiring unit 2, an occupant identification unit 3, an occupant identification information storage unit 4, an object identification unit 5, an object identification information storage unit 6, an object owner determining unit 7, an object owner information storage unit 8, an object misplacement determining unit 9, and a warning unit 10.

The captured image acquiring unit 2 acquires an image captured by one or more cameras mounted in the cabin of a vehicle. For example, in a case in which a driver monitoring system (DMS) that monitors the state of the driver or the like by using a camera, a sensor, or the like is mounted in the vehicle, the captured image acquiring unit 2 can employ a near-infrared camera or the like of the DMS. The captured image acquiring unit 2 outputs the acquired captured images to the occupant identification unit 3 and the object identification unit 5.

The occupant identification unit 3 detects the getting in and getting out of a vehicle of an occupant by using a captured image acquired by the captured image acquiring unit 2, and generates occupant identification information by identifying the occupant who has got in the vehicle. The occupant identification unit 3 causes the occupant identification information storage unit 4 to store the generated occupant identification information. Further, when detecting an occupant getting out of the vehicle, the occupant identification unit 3 acquires the occupant identification information about this occupant from the occupant identification information storage unit 4, and outputs the occupant identification information to the object misplacement determining unit 9.

More concretely, the occupant identification unit 3 detects the presence or absence of a person who has got in the vehicle, the presence or absence of a person getting out of the vehicle, and the seat position where a person who has got in the vehicle sit down, and identifies each individual on the basis of a bodily feature like the individual's face or physique. The above functions by the occupant identification unit 3 are implemented by, for example, the DMS employing a near-infrared camera. The occupant identification unit 3 does not have to perform the detection of the occurrence or nonoccurrence of an occupant's getting-in action, occurrence or nonoccurrence of an occupant's getting-out action, and the seat position on the basis of only the tracking of occupants by using the DMS, and may perform the detection by using a combination of the tracking and vehicle information showing the open and closed states of vehicle doors, or the like.

The object identification unit 5 detects the presence or absence of an object using a captured image acquired by the captured image acquiring unit 2 and generates object identification information by identifying the detected object. The object identification unit 5 causes the object identification information storage unit 6 to store the generated object identification information. Further, when detecting an object, the object identification unit 5 acquires the object identification information about this object from the object identification information storage unit 6, and outputs the object identification information to the object owner determining unit 7.

More concretely, the object identification unit 5 detects the presence or absence of an object existing in the vehicle, and detects the location in the vehicle of the detected object. Then, the object identification unit 5 detects whether or not an object is carried into the vehicle by an occupant and whether or not an object is carried out of the vehicle by an occupant who gets out, on the basis of the locations of detected objects. Further, the object identification unit 5 extracts the outer shape, the size, the feature points, etc. of each object present in the vehicle, to recognize and identify the object. The object identification unit 5 may detect another object that an occupant takes out of an object that was carried into the vehicle, of the clothes that the occupant is wearing, or the like, and assume the other object as an object carried into the vehicle. Further, the object identification unit 5 may detect another object that an occupant put away in an object that was carried into the vehicle, in the clothes that the occupant is wearing, or the like, and assume the other object as an object that is to be carried out of the vehicle. In addition, when an occupant takes off the clothes that the occupant is wearing and places the clothes at any position in the vehicle, the object identification unit 5 may assume the clothes as an object carried into the vehicle, and, when an occupant wears the clothes carried into the vehicle, the object identification unit 5 may assume the clothes as an object that is to be carried out of the vehicle.

The object owner determining unit 7 determines the owner of each object identified by the object identification unit 5 out of the occupants identified by the occupant identification unit 3 using the occupant identification information and the object identification information, to generate object owner information. The object owner determining unit 7 causes the object owner information storage unit 8 to store the generated object owner information.

When getting out of an occupant is detected by the occupant identification unit 3, the object misplacement determining unit 9 receives the occupant identification information about this occupant. The object misplacement determining unit 9 acquires the object owner information about the occupant who gets out from the object owner information storage unit 8 using the occupant identification information received from the occupant identification unit 3. Then, the object misplacement determining unit 9 determines whether or not an object owned by the occupant who gets out is misplaced in the vehicle using the object owner information, and outputs a result of the determination to the warning unit 10. For example, in a situation in which the occupant who gets out does not hold an object owned by the occupant, that is, in a situation in which the object is likely to be misplaced, the object misplacement determining unit 9 determines that the object is to be misplaced.

When the object misplacement determining unit 9 determined that an object owned by the occupant who gets out is to be misplaced in the vehicle, the warning unit 10 provides a warning regarding the misplacement of the object. The warning unit 10 makes the sound output unit 11 output a warning sound. As an alternative, the warning unit 10 makes the display unit 12 display an image showing the occupant who gets out and the misplaced object. The warning unit 10 may perform both the output of the warning sound and the display of the image, or perform only one of them. It is desirable that before the above "the occupant who gets out" finishes getting out of the vehicle, this warning unit 10 provides a warning of the misplacement of the object for the above "the occupant who gets out." Further, when an occupant other than the above "the occupant who gets out" remains in the vehicle, the warning unit 10 can provide a warning of the misplacement of the object of the above "the occupant who gets out" to the other occupant remaining in the vehicle after the above "the occupant who gets out" finishes getting out of the vehicle.

Next, the details of an operation of the vehicle interior monitoring device 1 will be explained.

Figure 2:
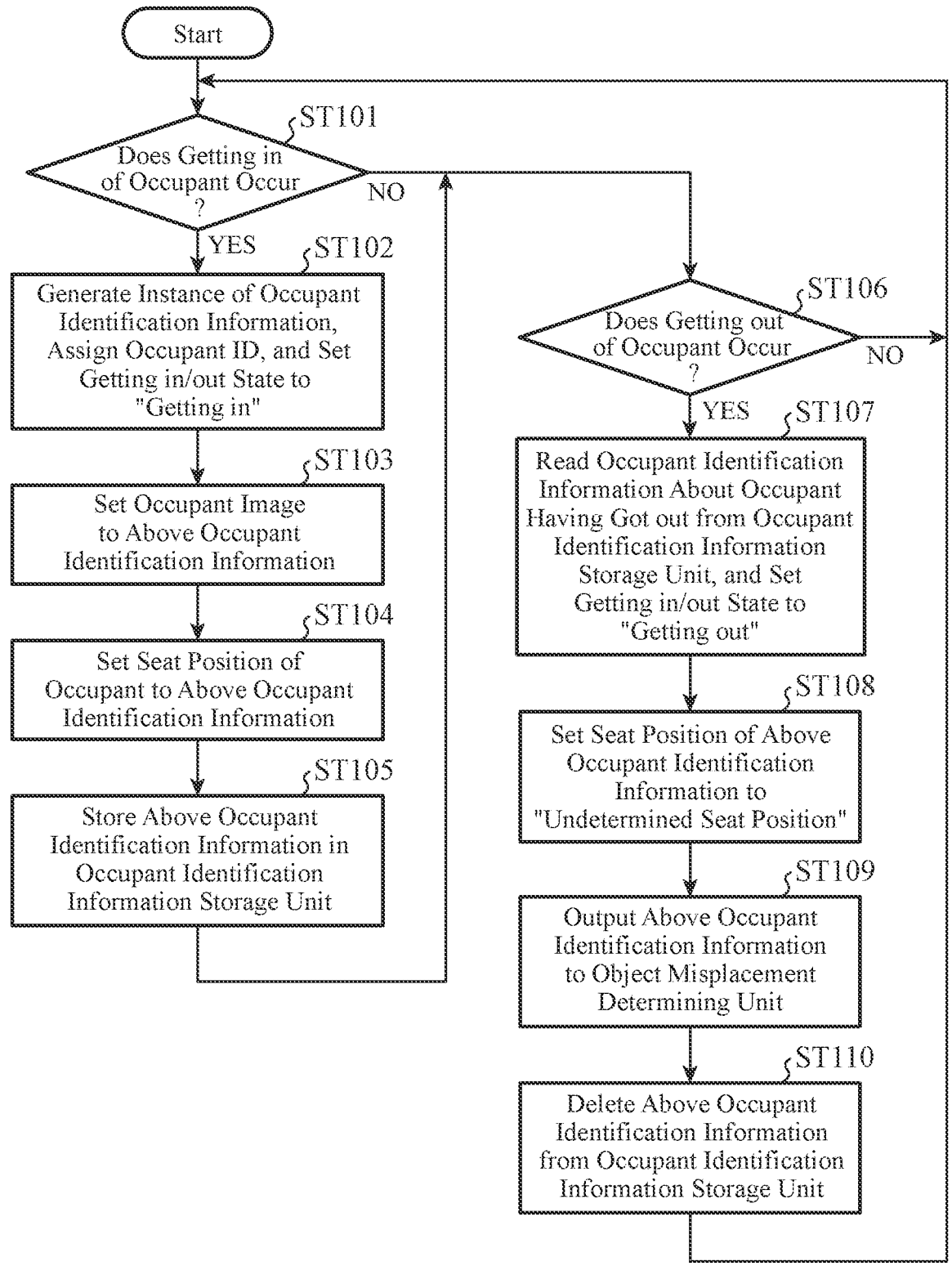
FIG. 2 is a flowchart showing an example of an operation of an occupant identification unit in Embodiment 1.

First, an operation of the occupant identification unit 3 will be explained. FIG. 2 is a flowchart showing an example of the operation of the occupant identification unit 3 in Embodiment 1. FIG. 3 is a view showing an example of occupant identification information in Embodiment 1. The occupant identification information shown in FIG. 3 includes an occupant image, an occupant ID, a getting in/out state, and a seat position.

In step ST101, the occupant identification unit 3 detects the occurrence or nonoccurrence of getting in of an occupant using a captured image received from the captured image acquiring unit 2. When detecting getting in of an occupant ("YES" in step ST101), the occupant identification unit 3 proceeds to step ST102; otherwise ("NO" in step ST101), the occupant identification unit 3 proceeds to step ST106.

In step ST102, the occupant identification unit 3 identifies the occupant detected in step ST101, generates an instance of occupant identification information, and assigns a specific occupant ID and sets the getting in/out state to "getting in."

In step ST103, the occupant identification unit 3 generates, for example, data about an image of the occupant, by extracting an area in which the occupant is captured from the captured image, and sets the image data to the occupant image of the above occupant identification information.

In step ST104, the occupant identification unit 3 detects the seat position where the occupant sit down using the captured image, and sets the seat position to the seat position in the above occupant identification information.

In step ST105, the occupant identification unit 3 stores the above occupant identification information to which the occupant image, the occupant ID, the getting in/out state, and the seat position are set in the occupant identification information storage unit 4.

In step ST106, the occupant identification unit 3 detects the occurrence or nonoccurrence of getting out of an vehicle of an occupant using a captured image received from the captured image acquiring unit 2. When detecting getting out of an occupant ("YES" in step ST106), the occupant identification unit 3 proceeds to step ST107; otherwise ("NO" in step ST106), the occupant identification unit 3 returns to step ST101.

In step ST107, the occupant identification unit 3 identifies the occupant whose getting out is detected in step ST106, and reads the occupant identification information about this occupant from the occupant identification information storage unit 4. Then, the occupant identification unit 3 updates the getting in/out state of the read occupant identification information to "getting out."

In step ST108, the occupant identification unit 3 updates the seat position in the above occupant identification information to "undetermined seat position."

In step ST109, the occupant identification unit 3 outputs the above occupant identification information to the object misplacement determining unit 9. When receiving, as a trigger, the above occupant identification information meaning getting out of the occupant from the occupant identification unit 3, the object misplacement determining unit 9 performs an object misplacement determining operation shown in FIG. 10 described later.

In step ST110, the occupant identification unit 3 deletes the above occupant identification information from the occupant identification information storage unit 4. The occupant identification unit 3 returns to step ST101 after step ST110.

As described above, the occupant identification unit 3 performs the management of getting in and getting out of occupants by performing the operation shown in FIG. 2.

Figure 4:
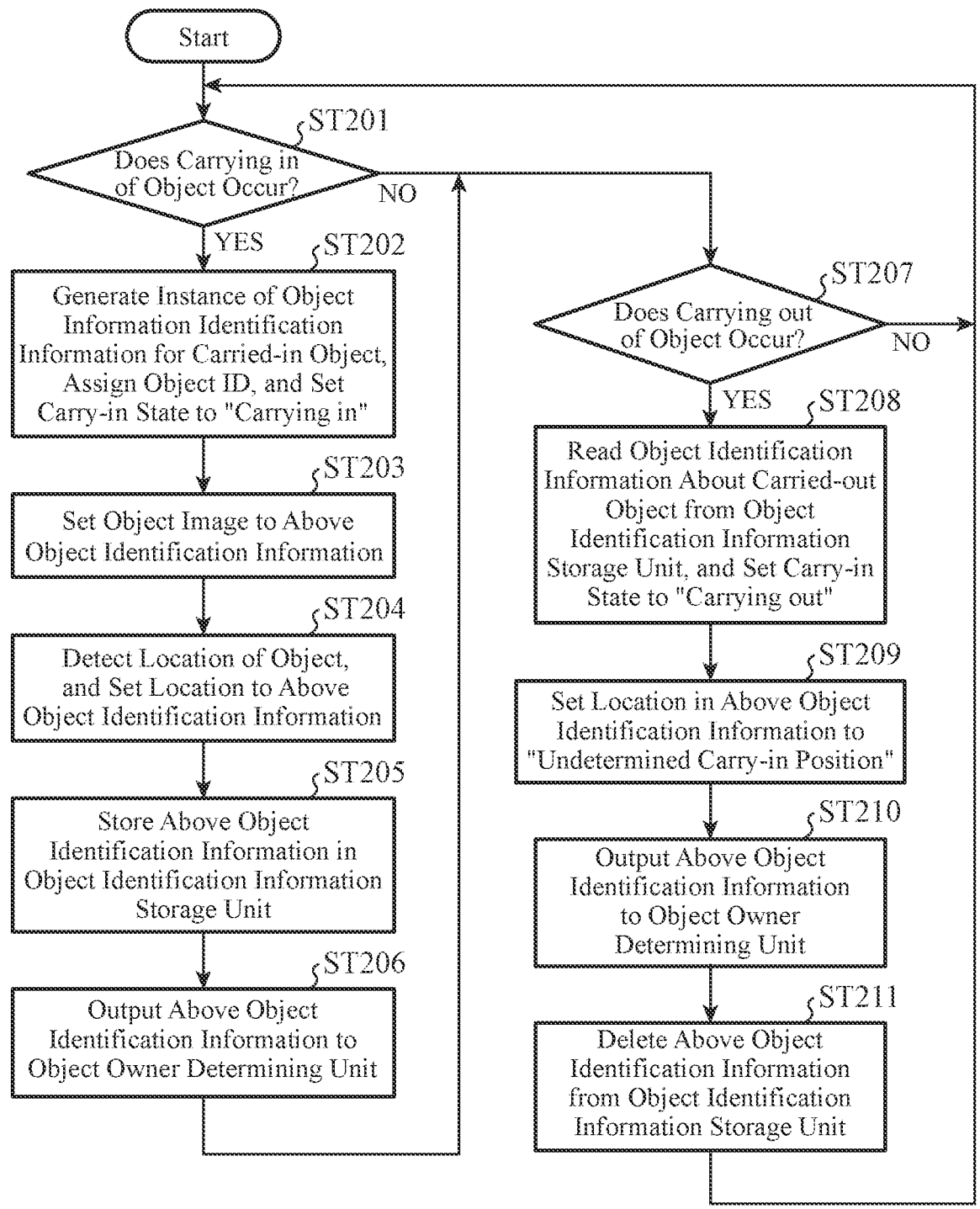
FIG. 4 is a flowchart showing an example of an operation of an object identification unit in Embodiment 1.

Next, an operation of the object identification unit 5 will be explained. FIG. 4 is a flowchart showing an example of the operation of the object identification unit 5 in Embodiment 1. FIG. 5 is a view showing an example of object identification information in Embodiment 1. The object identification information shown in FIG. 5 includes an object image, an object ID, a carry-in state, and the location.

In step ST201, the object identification unit 5 detects whether or not an object is carried in the vehicle using a captured image received from the captured image acquiring unit 2. When detecting carrying-in of an object ("YES" in step ST201), the object identification unit 5 proceeds to step ST202; otherwise ("NO" in step ST201), the object identification unit 5 proceeds to step ST207.

In step ST202, the object identification unit 5 identifies the object detected in step ST201, generates an instance of object identification information, and assigns a specific object ID and sets the carry-in state to "carrying in."

In step ST203, the object identification unit 5 generates, for example, data about an image of the object by extracting an area in which the object is captured from the captured image, and sets the image data to the object image of the above object identification information.

In step ST204, the object identification unit 5 detects the location at which the object is placed using the captured image, and sets the location to the location in the above object identification information.

In step ST205, the object identification unit 5 stores the above object identification information to which the object image, the object ID, the carry-in state, and the location are set in the object identification information storage unit 6.

In step ST206, the object identification unit 5 outputs the above object identification information to the object owner determining unit 7. When, in step ST206 or step ST210 described later, receiving, as a trigger, the object identification information outputted from the object identification unit 5, the object owner determining unit 7 performs an object owner determining operation shown in FIG. 6 described later.

In step ST207, the object identification unit 5 detects whether or not an object is carried out of the vehicle using a captured image received from the captured image acquiring unit 2. When detecting carrying out of an object ("YES" in step ST207), the object identification unit 5 proceeds to step ST208; otherwise ("NO" in step ST207), the object identification unit 5 returns to step ST201.

In step ST208, the object identification unit 5 identifies the object detected in step ST207 and reads the object identification information about this object from the object identification information storage unit 6. Then, the object identification unit 5 updates the carry-in state in the read object identification information to "carrying out."

In step ST209, the object identification unit 5 updates the location in the above object identification information to "undetermined carry-in position."

In step ST210, the object identification unit 5 outputs the above object identification information to the object owner determining unit 7.

In step ST211, the object identification unit 5 deletes the above object identification information from the object identification information storage unit 6. The object identification unit 5 returns to step ST201 after step ST211.

As described above, the object identification unit 5 performs the management of the positions of objects by performing the operation shown in FIG. 4.

Figure 6:
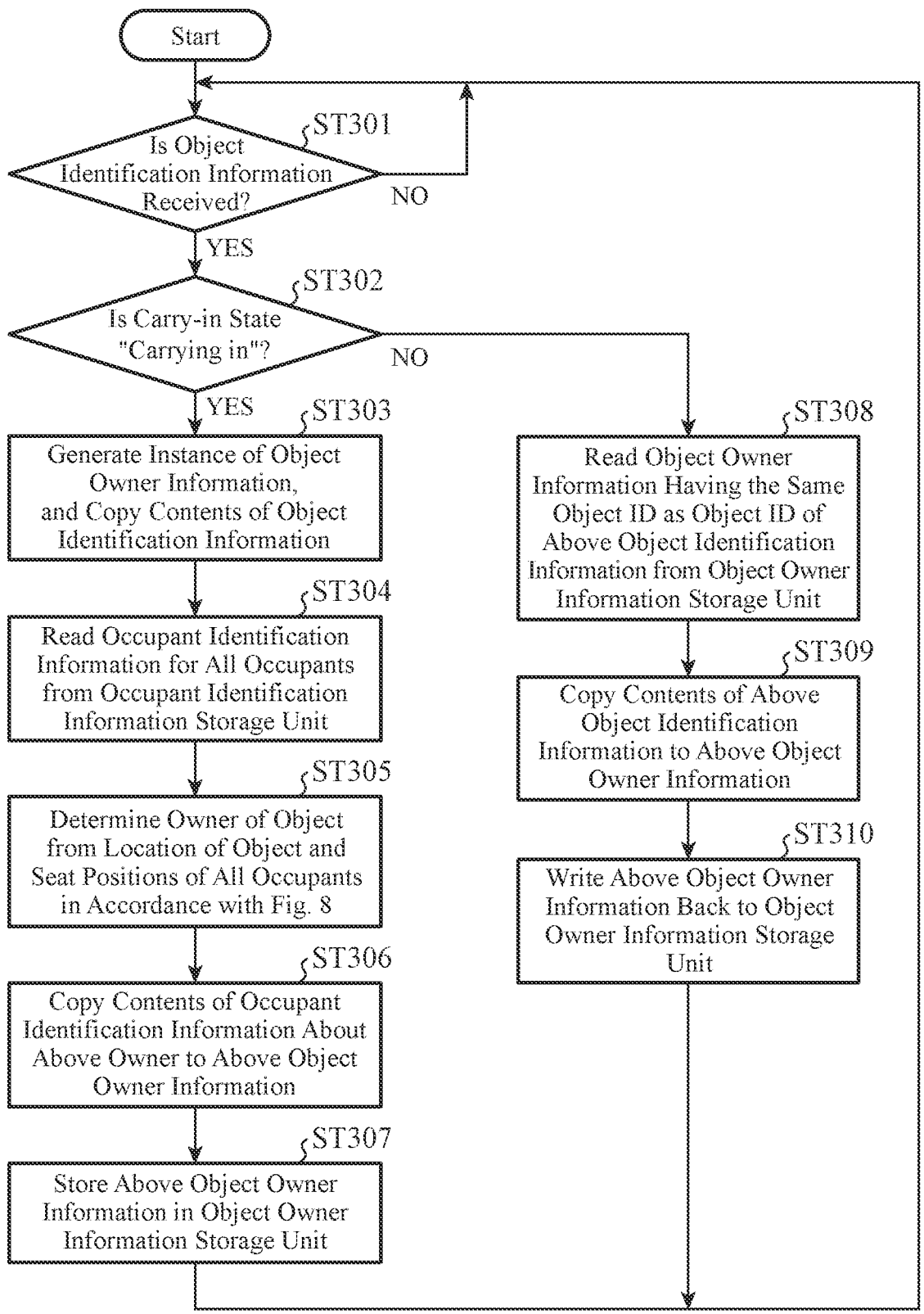
FIG. 6 is a flowchart showing an example of an operation of an object owner determining unit in Embodiment 1.

Next, an operation of the object owner determining unit 7 will be explained. FIG. 6 is a flowchart showing an example of the operation of the object owner determining unit 7 in Embodiment 1. FIG. 7 is a view showing an example of a piece of object owner information in Embodiment 1. The object owner information shown in FIG. 7 includes an object image, an object ID, a carry-in state, a location, an owner image, an owner ID, a getting in/out state, and a seat position.

In step ST301, when receiving object identification information from the object identification unit 5 ("YES" in step ST301), the object owner determining unit 7 proceeds to step ST302; otherwise ("NO" in step ST301), the object owner determining unit 7 returns to step ST301.

In step ST302, when the carry-in state in the above object identification information is "carrying in" ("YES" in step ST302), the object owner determining unit 7 proceeds to step ST303, whereas when the carry-in state is "carrying out" ("NO" in step ST302), the object owner determining unit 7 proceeds to step ST308.

In step ST303, the object owner determining unit 7 generates an instance of object owner information, and copies the object image, the object ID, the carry-in state, and the location in the above object identification information, respectively, to the object image, the object ID, the carry-in state, and the location in the object owner information.

In step ST304, the object owner determining unit 7 reads the pieces of occupant identification information about all the occupants in the vehicle, the pieces of occupant identification information being stored in the occupant identification information storage unit 4.

In step ST305, the object owner determining unit 7 determines the owner of the object indicated by the above object identification information out of all the occupants in the vehicle using information in which a relation between the location of the object and the priority of a seat position having a high possibility that the owner of the object is present is defined.

Here, in FIG. 8, an example of the information in Embodiment 1 in which a relation between the location in the object identification information and the priority of the seat position in the occupant identification information corresponding to an occupant having a high possibility of being the owner is defined is shown. The table shown in FIG. 8 is defined in such a way that an occupant sitting on a seat having a higher possibility that an object is placed at a specific location of the seat has a higher priority as an owner candidate. In the example of FIG. 8, when the location in the object identification information about an object carried in the vehicle is the "driver's seat", the object owner determining unit 7 determines that the occupant sitting on the driver's seat is the owner of the object. Further, in the case in which the location in the object identification information about an object carried in the vehicle is the "front seat", when two occupants are sitting on the driver's seat and the front seat, respectively, the object owner determining unit 7 determines that the occupant sitting on the front seat having a higher priority is the owner of the object, whereas when an occupant is sitting only on the driver's seat, the object owner determining unit 7 determines that the occupant sitting on the driver's seat is the owner of the object.

In step ST306, the object owner determining unit 7 copies the occupant image, the occupant ID, the getting in/out state, and the seat position in the occupant identification information about the occupant who is determined to be the owner of the object, respectively, to the owner image, the owner ID, the getting in/out state, and the seat position in the above object owner information.

Figure 9:
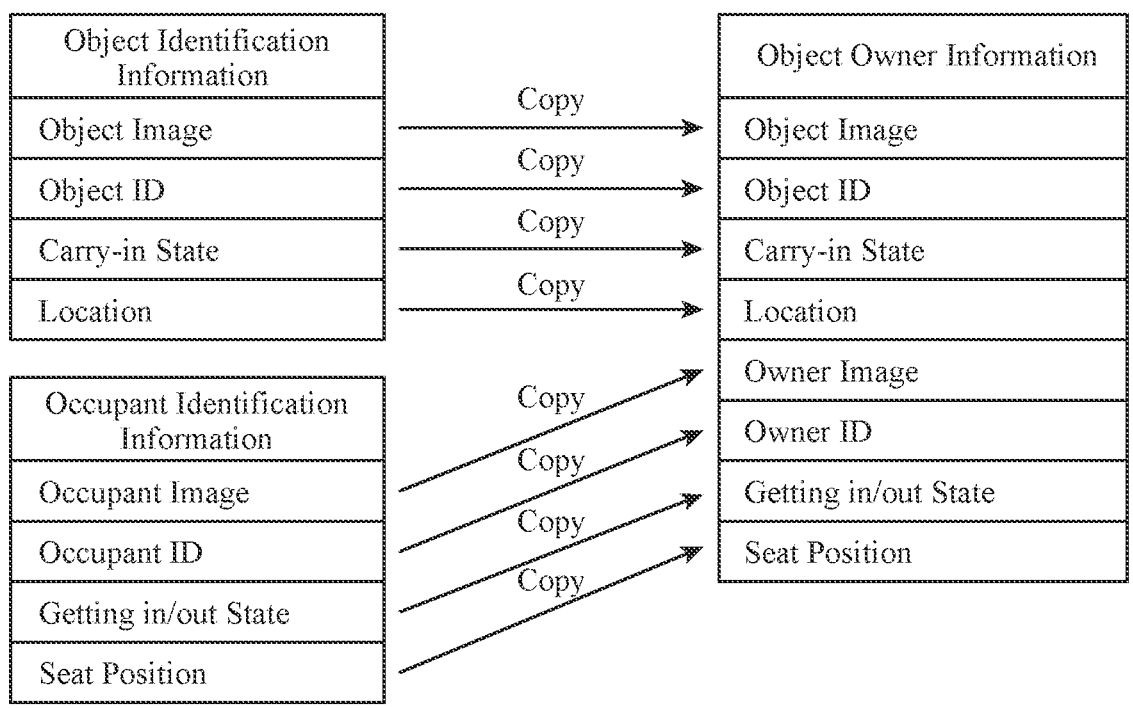
FIG. 9 is a view showing an example of the generation of object owner information in Embodiment 1.

Here, an example of the generation of object owner information in Embodiment 1 is shown in FIG. 9. As described above, the object owner determining unit 7 determines the owner of the object by comparing the location in the object identification information and the seat position in the occupant identification information in accordance with the information shown in FIG. 8. Then, the object owner determining unit 7 generates object owner information by combining the object identification information about the object and the occupant identification information about the occupant who is determined to be the owner of the object.

In step ST307, the object owner determining unit 7 stores the above object owner information in the object owner information storage unit 8. The object owner determining unit 7 returns to step ST301 after step ST307.

In step ST308, the object owner determining unit 7 reads the object owner information having an object ID matching the object ID of the object identification information received from the object identification unit 5 from the object owner information storage unit 8.

In step ST309, the object owner determining unit 7 copies the object image, the object ID, the carry-in state, and the location in the above object identification information, respectively, to the object image, the object ID, the carry-in state, and the location in the object owner information read from the object owner information storage unit 8.

In step ST310, the object owner determining unit 7 writes the above object owner information back to the object owner information storage unit 8. The object owner determining unit 7 returns to step ST301 after step ST310.

As described above, by performing the operation shown in FIG. 6, the object owner determining unit 7 establishes correspondences showing that which object is owned by which occupant.

Figure 10:
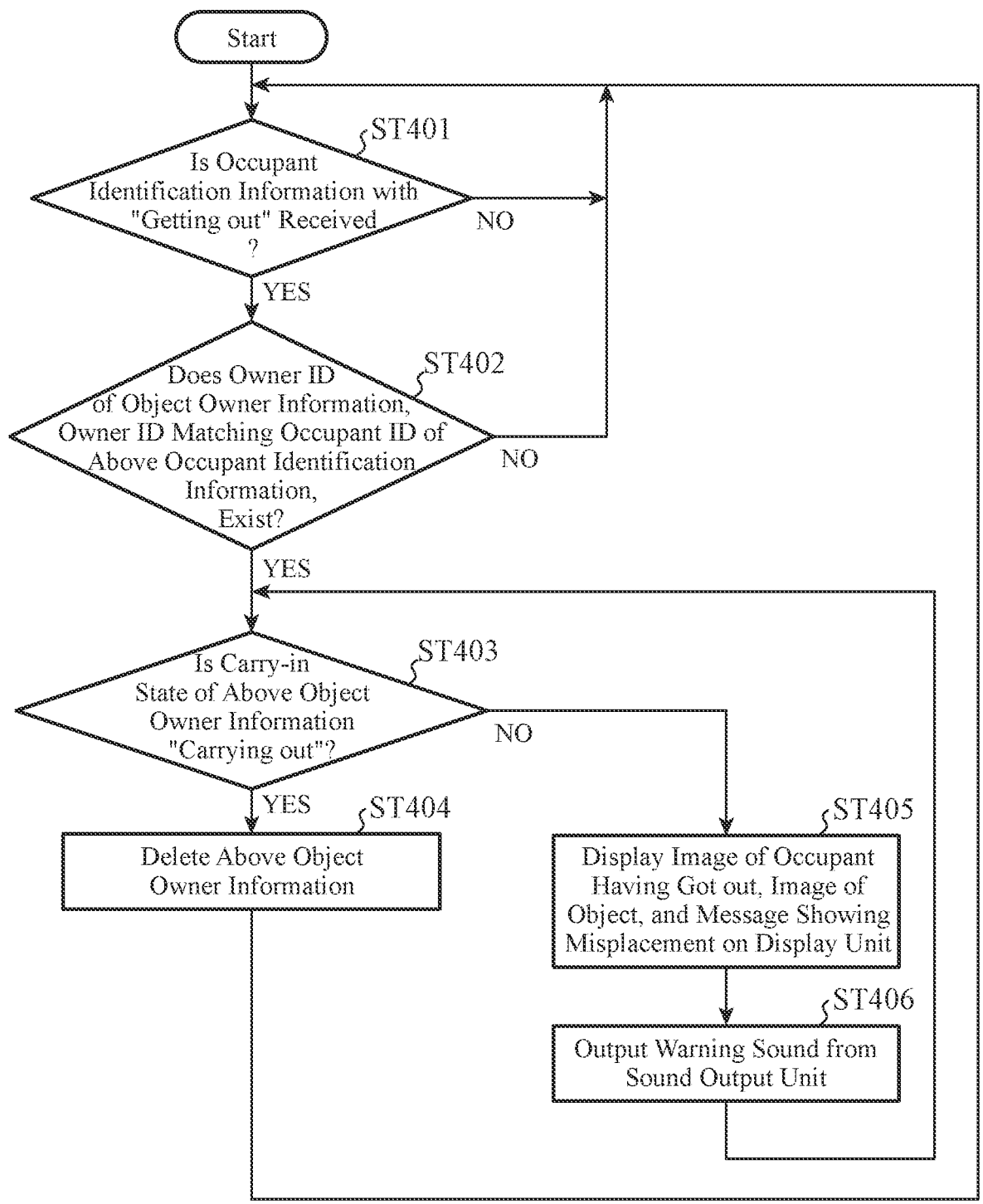
FIG. 10 is a flowchart showing an example of operations of an object misplacement determining unit and a warning unit in Embodiment 1.

Next, the operations of the object misplacement determining unit 9 and the warning unit 10 will be explained. FIG. 10 is a flowchart showing an example of the operations of the object misplacement determining unit 9 and the warning unit 10 in Embodiment 1.

In step ST401, when receiving occupant identification information whose getting in/out state is "getting out" from the occupant identification unit 3 ("YES" in step ST401), the object misplacement determining unit 9 proceeds to step ST402; otherwise ("NO" in step ST401), the object misplacement determining unit 9 returns to step ST401.

In step ST402, the object misplacement determining unit 9 determines whether or not object owner information having an owner ID matching the occupant ID of the above occupant identification information is stored in the object owner information storage unit 8. When one or more pieces of object owner information having an owner ID matching the occupant ID exist in the object owner information storage unit 8, it means that the occupant whom the above occupant ID is assigned carried one or more objects whose number is equal to the number of pieces of the object owner information in the vehicle at the time of getting in, and there is a possibility that the occupant gets out of the vehicle with a carried-in object misplaced. In contrast, when no object owner information having an owner ID matching the occupant ID exists in the object owner information storage unit 8, it means that the occupant whom the above occupant ID is assigned did not carry any object in the vehicle at the time of getting in, and no misplacing of an object occurs at the time of getting out. When one or more pieces of object owner information having an owner ID matching the occupant ID exist in the object owner information storage unit 8 ("YES" in step ST402), the object misplacement determining unit 9 proceeds to step ST403, whereas when such object owner information does not exist ("NO" in step ST402), the object misplacement determining unit 9 returns to step ST401.

In step ST403, the object misplacement determining unit 9 determines whether or not the carry-in state in each piece of object owner information having an owner ID matching the occupant ID of the above occupant identification information is "carrying out." When the carry-in state in object owner information is "carrying out", it means that the object owned by the occupant who has got out is also carried out of the vehicle together with the occupant, and no misplacing of the object occurs at the time of getting out. In contrast, when the carry-in state in object owner information is "carrying in", it means that the occupant who has got out misplaced the object owned by the occupant in the vehicle. When the carrying out state of the above object owner information is "carrying out" ("YES" in step ST403), the object misplacement determining unit 9 proceeds to step ST404, whereas when the carrying out state is "carrying in" ("NO" in step ST403), the object misplacement determining unit 9 proceeds to step ST405.

In step ST404, the object misplacement determining unit 9 deletes the above object owner information that becomes unnecessary from the object owner information storage unit 8.

In step ST405, the object misplacement determining unit 9 outputs information showing the misplacing of the object and the above object owner information to the warning unit 10. The display unit 12 displays the object image and the owner image of the above object owner information. Further, the display unit 12 may display a message showing a warning of the misplacement of the object, in addition to the object image and the owner image.

In step ST406, the sound output unit 11 provides a notification of the misplacing of the object by outputting a warning sound. The sound output unit 11 may output a message showing a warning of the misplacement of the object by voice, instead of the warning sound.

The warning of the misplacement in steps ST405 and ST406 is continued until the carry-in states of all pieces of object owner information that is recognized, in step ST402, to exist in the object owner information storage unit 8 change from "carrying in" to "carrying out."

As described above, when an occupant gets out, the object misplacement determining unit 9 and the warning unit 10 provide a warning of the misplacement of an object owned by this occupant by performing the operation shown in FIG. 10.

Figure 11:
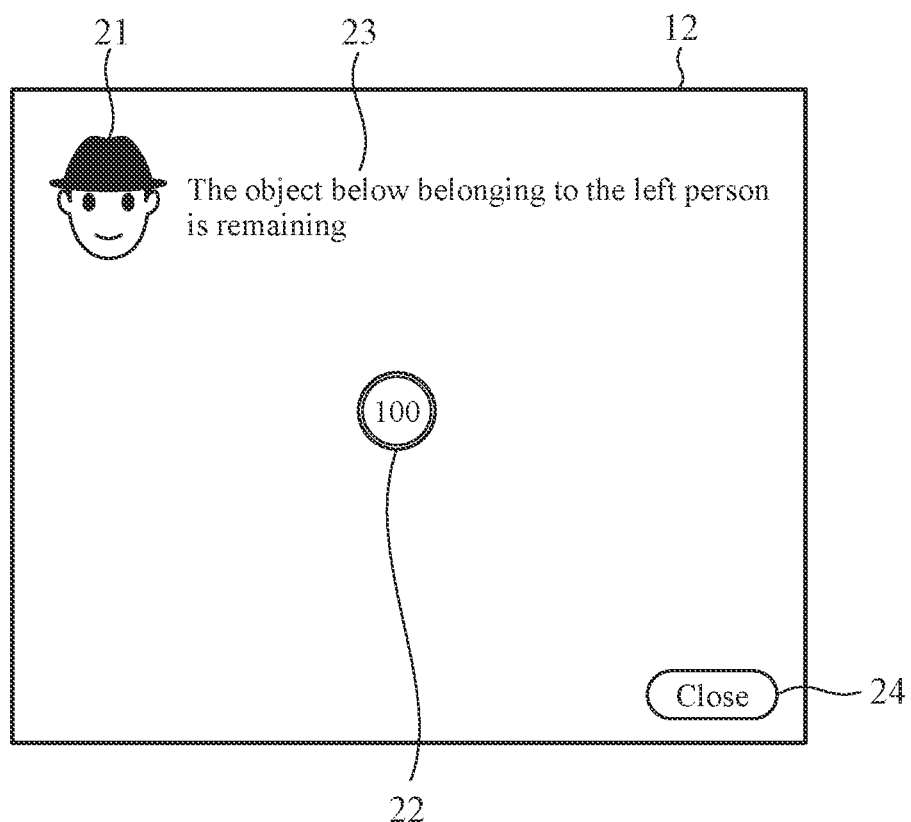
FIG. 11 is a view showing an example of a screen for providing a warning of the misplacement of an object, the screen being displayed by a display unit in Embodiment 1.

In FIG. 11, an example of a screen displayed by the display unit 12 in Embodiment 1 for providing a warning of the misplacement of an object is shown. The display unit 12 can be any type of display as long as the display unit 12 is a display existing in the vehicle, such as a center display mounted in an instrument panel, a display of a navigation device, or a display of a rear entertainment system. In the example of FIG. 11, the owner image 21 of an occupant who has got out, the object image 22 of a misplaced object owned by the occupant who has got out, a message 23 informing that "The below object of the left person is still remaining", and a close button 24 for stopping the display of this warning screen are displayed on the screen of the display unit 12. The misplaced object in this example is a coin.

As described above, the captured image acquiring unit 2 of Embodiment 1 acquires a captured image that is generated by capturing an image of an interior of a vehicle. The occupant identification unit 3 detects getting in and getting out of a vehicle of each of occupants using the captured image acquired by the captured image acquiring unit 2, and generates occupant identification information by identifying each of the occupants who has got in as an identified occupant. The object identification unit 5 detects presence or absence of an object using the captured image acquired by the captured image acquiring unit 2, and generates object identification information by identify an object detected to be present as an identified object. The object owner determining unit 7 generates object owner information by determining an owner of the identified object identified by the object identification unit 5, out of the occupants identified by the occupant identification unit 3, using the occupant identification information and the object identification information. The object misplacement determining unit 9 determines, when getting out of an occupant is detected by the occupant identification unit 3, whether or not an object owned by the occupant who gets out is misplaced in the vehicle using the object owner information about the occupant who gets out. The warning unit 10 provides a warning when the object misplacement determining unit 9 determines that an object owned by the occupant who gets out is misplaced in the vehicle. With this configuration, when an occupant gets out, the vehicle interior monitoring device 1 can provide a warning of the misplacement of an object owned by the occupant, thereby being able to prevent the misplacing of an object.

Further, the occupant identification unit 3 of Embodiment 1 generates the occupant identification information to include a seat position of the identified occupant, and the object identification unit 5 generates the object identification information to include a location of the identified object. The object owner determining unit 7 determines the owner of an object on the basis of a relation between the seat position included in the occupant identification information and the location included in the object identification information. With this configuration, the object owner determining unit 7 can establish correspondences showing that which object is owned by which occupant on the basis of a positional relationship between objects and occupants.

Further, the object owner determining unit 7 of Embodiment 1 determines the owner of an object using information as shown in FIG. 8 in which a relation between the location of an object and a priority of a seat position having a high possibility that the owner of an object is present is defined. With this configuration, the object owner determining unit 7 can determine the owner of each object by performing a simple referring process.

Embodiment 2

The vehicle interior monitoring device 1 of Embodiment 1 is configured so as to automatically determine the owner of an object. A vehicle interior monitoring device 1 of Embodiment 2 is configured so as to change the owner of an object on the basis of an operation by an occupant.

Figure 12:
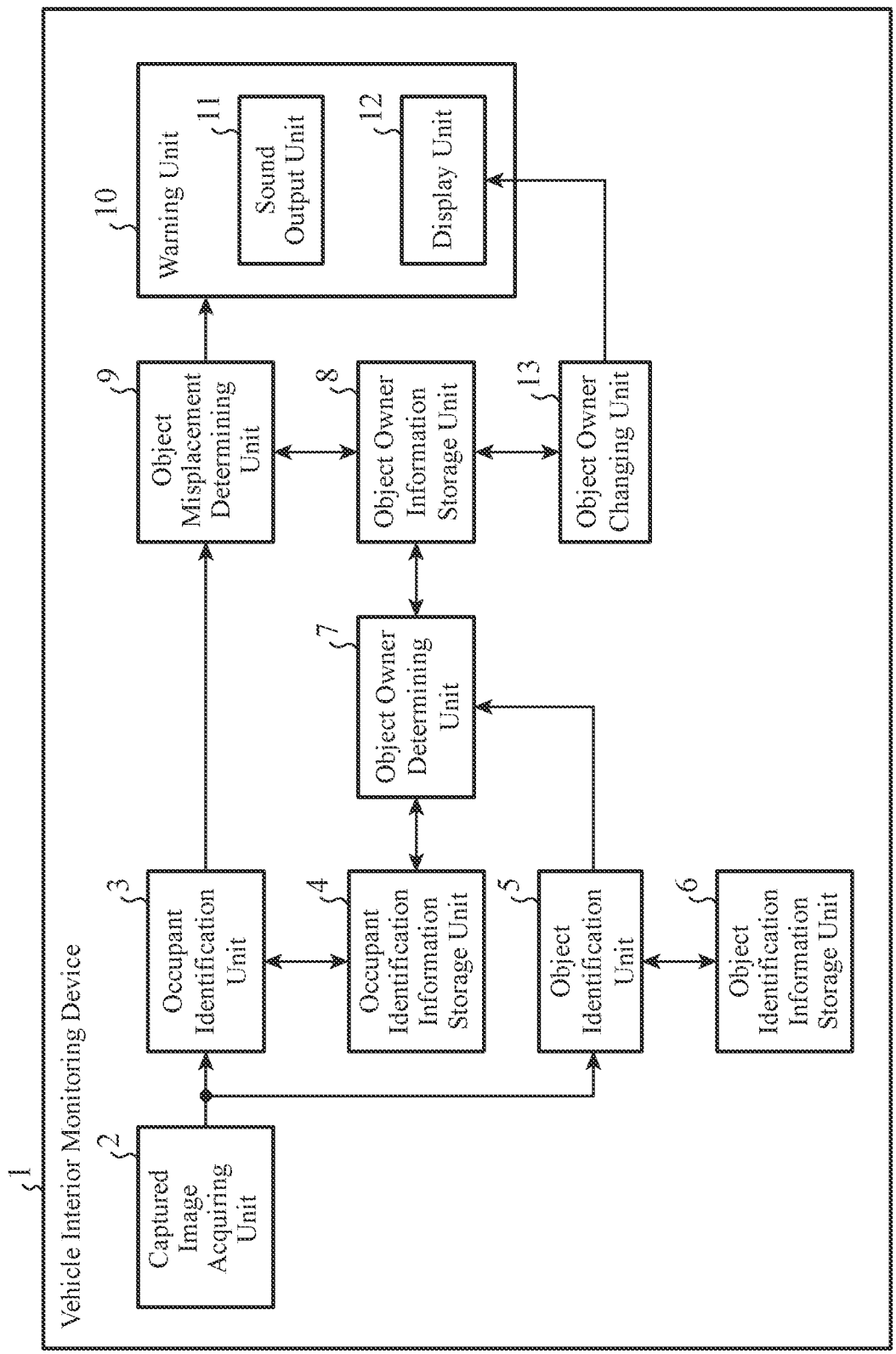
FIG. 12 is a block diagram showing an example of the configuration of a vehicle interior monitoring device according to Embodiment 2.

FIG. 12 is a block diagram showing an example of the configuration of the vehicle interior monitoring device 1 according to Embodiment 2. The vehicle interior monitoring device 1 according to Embodiment 2 has a configuration in which an object owner changing unit 13 is added to the vehicle interior monitoring device 1 of Embodiment 1 shown in FIG. 1. In FIG. 12, the same components as those shown in FIG. 1 or like components are denoted by the same reference signs, and an explanation of the components will be omitted hereinafter.

The object owner changing unit 13 changes the correspondence between an object included in object owner information generated by an object owner determining unit 7 and stored in an object owner information storage unit 8, and an occupant who is the owner of the object on the basis of information inputted from the outside. The information inputted from the outside is one inputted from an input device, such as a not-illustrated touch panel, machine button, or keypad, to the object owner changing unit 13, and shows the content of an operation that an occupant performed on the input device.

Figure 13:
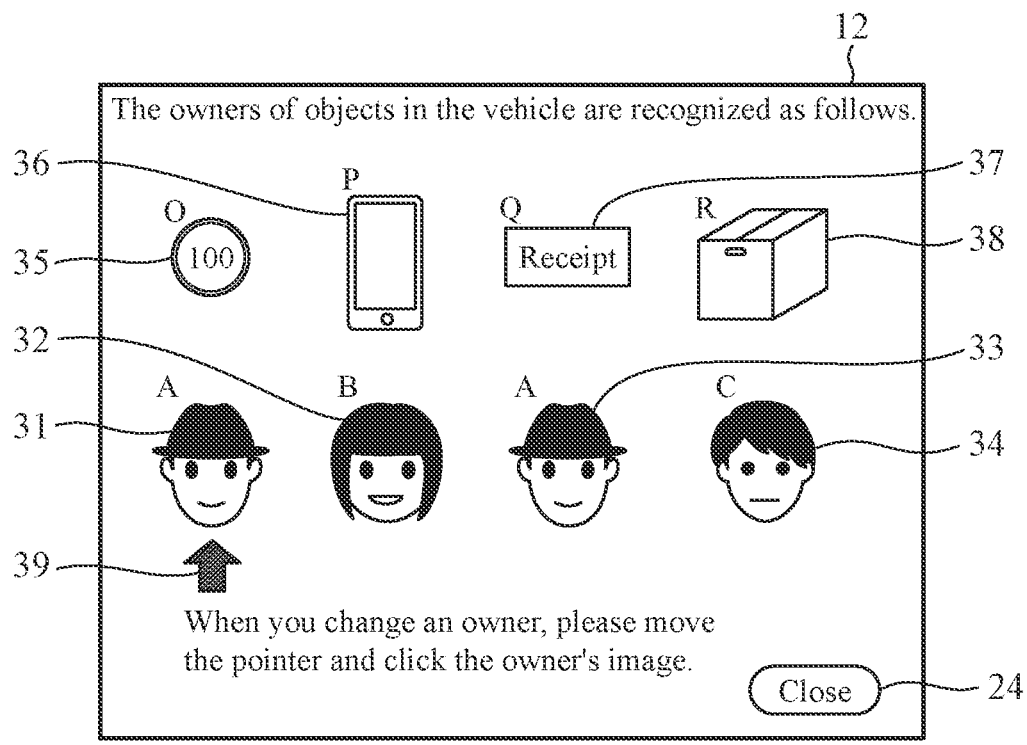
FIG. 13 is a view showing an example of a screen for changing the owner of an object, the screen being displayed by a display unit in Embodiment 2.

FIGS. 13, 14, 15, and 16 are views showing an example of screens that a display unit 12 displays in Embodiment 2, for changing the owner of an object. When, after an occupant has got in and closed the vehicle doors and before the vehicle starts traveling, the vehicle is at rest, an object is newly detected by an object identification unit 5, an occupant provides an instruction to display, or the like, the object owner changing unit 13 instructs the display unit 12 to display an object owner change screen as shown in FIG. 13. The display unit 12 of Embodiment 1 and the display unit 12 of Embodiment 2 may use the same display or different displays.

In the example shown in FIG. 13, the object owner changing unit 13 causes an owner image 31 of an occupant A, an owner image 32 of an occupant B, an owner image 33 of the occupant A, an owner image 34 of an occupant C, an object image 35 of an object O, an object image 36 of an object P, an object image 37 of an object Q, and an object image 38 of an object R to be displayed on the screen of the display unit 12. The object O is a coin, the object P is a smartphone, the object Q is a receipt, and the object R is a cardboard box. According to pieces of object owner information, the occupant A owns the objects O and Q, the occupant B owns the object P, and the occupant C owns the object R. On the basis of the above pieces of object owner information, the object owner changing unit 13 arranges the owner image 31 of the occupant A and the object image 35 of the object O along the vertical direction, arranges the owner image 32 of the occupant B and the object image 36 of the object P along the vertical direction, arranges the owner image 33 of the occupant A and the object image 37 of the object Q along the vertical direction, and arranges the owner image 34 of the occupant C and the object image 38 of the object R along the vertical direction, thereby expressing object relations. Therefore, occupants can recognize the owners of objects from the screen of FIG. 13.

Figure 14:
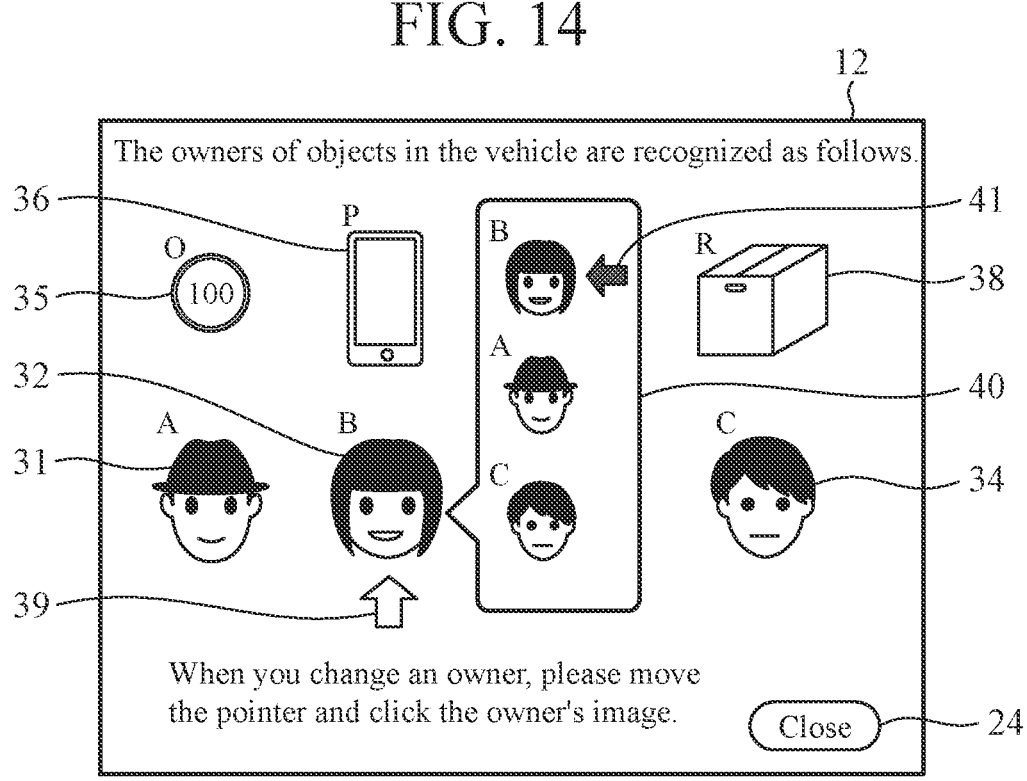
FIG. 14 is a view showing an example of a screen for changing the owner of an object, the screen being displayed by the display unit in Embodiment 2.
Figure 15:
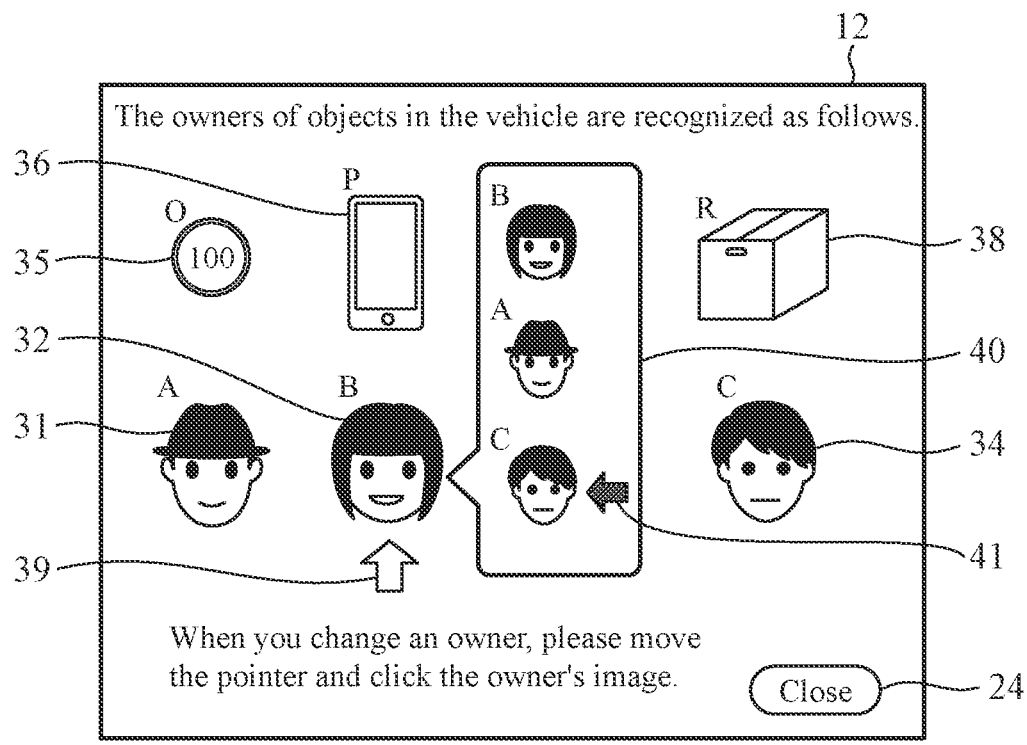
FIG. 15 is a view showing an example of a screen for changing the owner of an object, the screen being displayed by the display unit in Embodiment 2.
Figure 16:
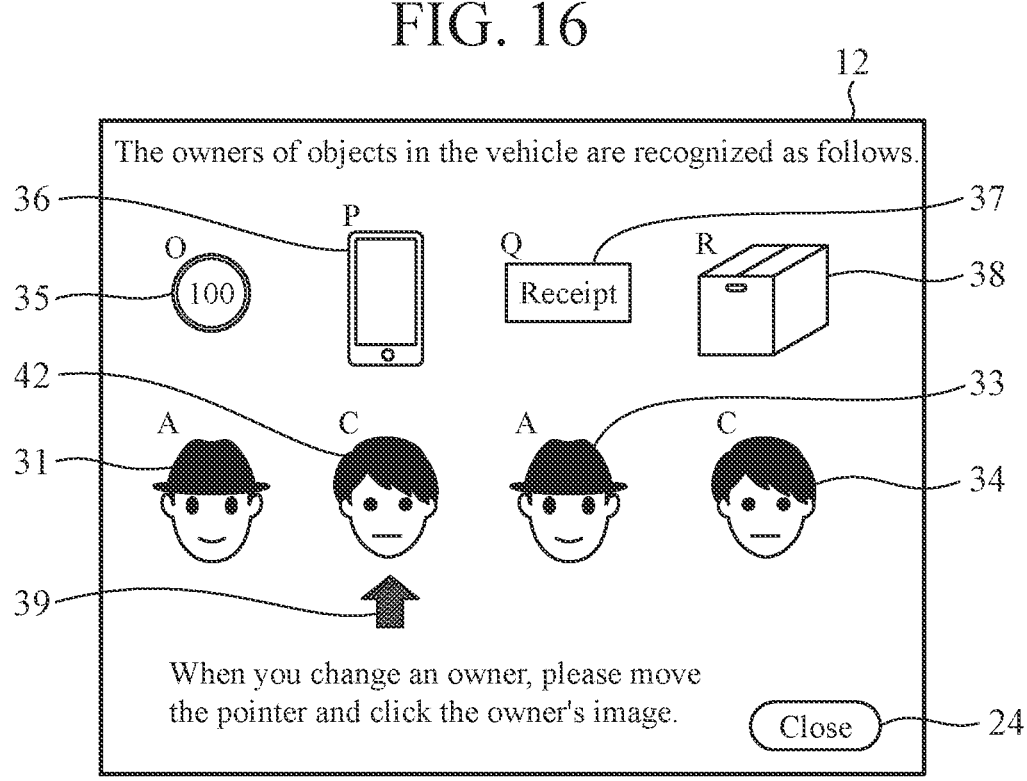
FIG. 16 is a view showing an example of a screen for changing the owner of an object, the screen being displayed by the display unit in Embodiment 2.

When an occupant desires to change the object relation between an object and its owner, the occupant operates a not-illustrated input device to move a pointer 39 to the position of the owner image of an occupant who is desired to be changed, and selects it. In the example of FIG. 14, because an occupant moves the pointer 39 to the position of the owner image 32 of the occupant B and selects it, the object owner changing unit 13 displays an occupant image list 40 showing owner candidates who are replacements for the occupant B beside the owner image 32 of the occupant B. An occupant operates the not-illustrated input device to move the pointer 41 to the position of the image of an occupant who is desired to be an occupant after changing, and selects it. In the example of FIG. 15, an occupant moves the pointer 41 to the position of the image of the occupant C and selects it, so that the object owner changing unit 13 changes the owner of the object P from the occupant B to the occupant C. Then, the object owner changing unit 13 arranges the object image 36 of the object P and the owner image 42 of the occupant C along the vertical direction, as shown in the example of FIG. 16.

The screens and the operation method of changing an object owner which are shown in FIGS. 13, 14, 15, and 16 are merely an example, and any types of screens and any operation method may be used as long as the owner of an object can be changed through an operation by an occupant.

When the owner of the object P is changed from the occupant B to the occupant C, as shown in the above example, the object owner changing unit 13 rewrites the occupant identification information about the occupant B, out of object owner information that is a combination of the object identification information about the object P and the occupant identification information about the occupant B, by the occupant identification information about the occupant C. At that time, the object owner changing unit 13 may extract the occupant identification information about the occupant C from the object owner information stored in the object owner information storage unit 8, or may acquire the occupant identification information about the occupant C from an occupant identification information storage unit 4. The object owner changing unit 13 causes the object owner information storage unit 8 to store the object owner information after rewriting.

As described above, the object owner changing unit 13 of Embodiment 2 changes the correspondence between an object included in object owner information generated by the object owner determining unit 7 and an occupant who is the owner of this object on the basis of information inputted from the outside. With this configuration, when the object owner information includes mismatch, occupants can correct this mismatch.

Embodiment 3

The vehicle interior monitoring device 1 of Embodiment 1 is configured so as to determine the owner of an object using the information in which a relation between the location of the object and the priority of a seat position having a high possibility that the owner of the object is present is defined. A vehicle interior monitoring device 1 of Embodiment 3 is configured so as to determine an occupant closest to an object as the owner of the object.

Since the configuration of the vehicle interior monitoring device 1 according to Embodiment 3 is the same as that shown in FIG. 1 of Embodiment 1 or FIG. 12 of Embodiment 2 on the drawings, FIGS. 1 and 12 will be used hereinafter. In this Embodiment 3, a captured image acquiring unit 2 acquires an image captured by a stereoscopic camera mounted in the cabin of a vehicle. The stereoscopic camera used for the DMS is used for this stereoscopic camera, for example.

FIG. 17 is a view showing an example of occupant identification information in Embodiment 3. Occupant identification information in Embodiment 3 is the same as the occupant identification information shown in FIG. 3 of Embodiment 1, except that the seat position is "[x, y, z] coordinate values." An occupant identification unit 3 of Embodiment 3 calculates the [x, y, z] coordinate values of an occupant in a three-dimensional orthogonal coordinate system (referred to as a "three-dimensional coordinate system" hereinafter) in accordance with the principle of triangulation using an image captured by the stereoscopic camera, and sets the [x, y, z] coordinate values as the seat position. Further, the [x, y, z] coordinate values of an occupant show, for example, the center of his or her face or the center of his or her body.

FIG. 18 is a view showing an example of object identification information in Embodiment 3. The object identification information in Embodiment 3 is the same as the object identification information shown in FIG. 5 of Embodiment 1, except that the location is "[x, y, z] coordinate values." An object identification unit 5 of Embodiment 3 calculates the [x, y, z] coordinate values of an object in the above three-dimensional coordinate system in accordance with the principle of triangulation using an image captured by the stereoscopic camera, and sets the [x, y, z] coordinate values as the location. The [x, y, z] coordinate values of an object show, for example, the center of the object.

FIG. 19 is a view showing an example of the object owner information in Embodiment 3. The object owner information in Embodiment 3 is the same as the object owner information shown in FIG. 7 of Embodiment 1, except that the location and the seat position are "[x, y, z] coordinate values."

Figure 20:
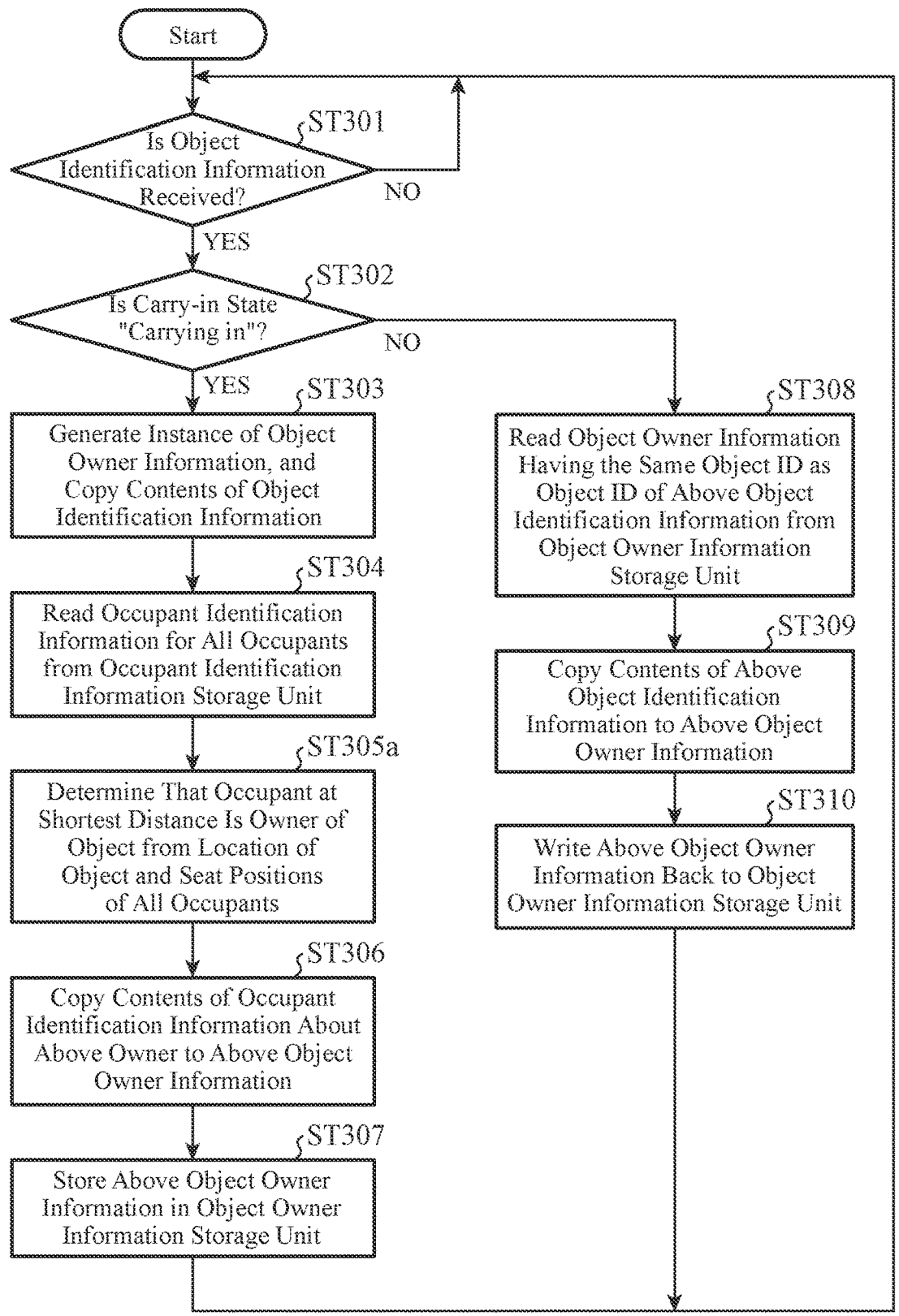
FIG. 20 is a flowchart showing an example of an operation of an object owner determining unit in Embodiment 3.

FIG. 20 is a flowchart showing an example of the operation of an object owner determining unit 7 in Embodiment 3. Since steps ST301 to ST304 and ST306 to ST310 of FIG. 20 are the same operations as those of steps ST301 to ST304 and ST306 to ST310 of FIG. 6, an explanation of the steps will be omitted.

In step ST305a, the object owner determining unit 7 compares the [x, y, z] coordinate values that are the seat position of occupant identification information about each of all occupants read, in step ST304, from an occupant identification information storage unit 4 and the [x, y, z] coordinate values which are the location of object identification information received, in step ST301, from the object identification unit 5. Then, the object owner determining unit 7 determines an occupant at [x, y, z] coordinate values closest to the [x, y, z] coordinate values of the object in the three-dimensional coordinate system, out of all the occupants, as the owner of the object.

As described above, the seat position included in occupant identification information of Embodiment 3 is the coordinate values of an identified occupant in the three-dimensional coordinate system, and the location included in object identification information is the coordinate values of an identified object in the three-dimensional coordinate system. The object owner determining unit 7 determines an occupant at coordinate values closest to the coordinate values of the object in the three-dimensional coordinate system as the owner of the object. With this configuration, the object owner determining unit 7 can determine an occupant being present at a position closest to an object as the owner of the object.

The object owner information generated by the object owner determining unit 7 of Embodiment 3 can be changed by the object owner changing unit 13 of Embodiment 2.

Finally, examples of the hardware configuration of the vehicle interior monitoring device 1 according to each of the embodiments will be explained.

Figure 21A:
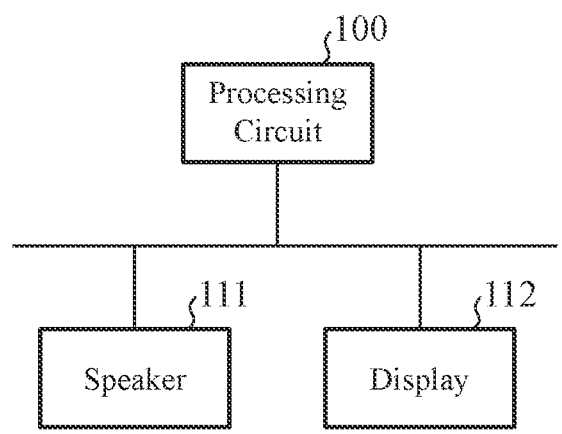
FIGS. 21A and 21B are diagrams showing examples of the hardware configuration of the vehicle interior monitoring device according to each of the embodiments.
Figure 21B:
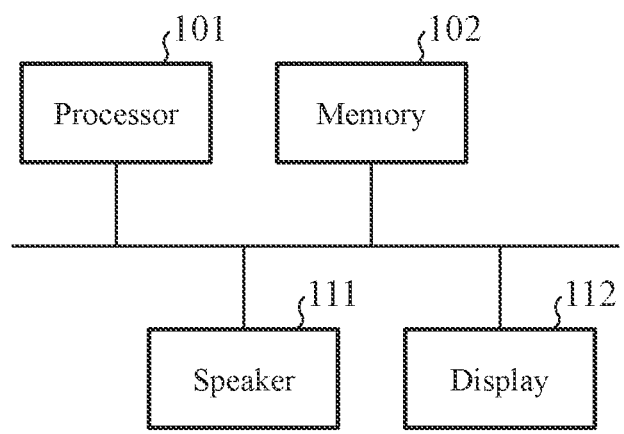

FIGS. 21A and 21B are diagrams showing examples of the hardware configuration of the vehicle interior monitoring device 1 according to each of the embodiments. The occupant identification information storage unit 4, the object identification information storage unit 6, and the object owner information storage unit 8 in the vehicle interior monitoring device 1 are a memory 102. The sound output unit 11 and the display unit 12 in the vehicle interior monitoring device 1 are a speaker 111 and a display 112. Each of the functions of the captured image acquiring unit 2, the occupant identification unit 3, the object identification unit 5, the object owner determining unit 7, the object misplacement determining unit 9, and the object owner changing unit 13 in the vehicle interior monitoring device 1 is implemented by a processing circuit. More specifically, the vehicle interior monitoring device 1 includes a processing circuit for implementing each of the above functions. The processing circuit may be a processing circuit 100 as hardware for exclusive use or a processor 101 that executes a program stored in the memory 102.

In the case in which the processing circuit is hardware for exclusive use, as shown in FIG. 21A, the processing circuit 100 is, for example, a single circuit, a composite circuit, a programmable processor, a parallel programmable processor, an application specific integrated circuit (ASIC), a field programmable gate array (FPGA), or a combination of these circuits. The functions of the captured image acquiring unit 2, the occupant identification unit 3, the object identification unit 5, the object owner determining unit 7, the object misplacement determining unit 9, and the object owner changing unit 13 may be implemented by multiple processing circuits 100, or the functions of the units may be implemented collectively by a single processing circuit 100.

In the case in which the processing circuit is a processor 101, as shown in FIG. 21B, each of the functions of the captured image acquiring unit 2, the occupant identification unit 3, the object identification unit 5, the object owner determining unit 7, the object misplacement determining unit 9, and the object owner changing unit 13 is implemented by software, firmware, or a combination of software and firmware. The software or the firmware is described as a program and the program is stored in the memory 102. The processor 101 implements the function of each of the units by reading and executing a program stored in the memory 102. More specifically, the vehicle interior monitoring device 1 includes the memory 102 for storing a program in which the steps shown in the flowcharts of FIG. 2 and soon are performed as a result when the program is executed by the processor 101. Further, it can be said that this program causes a computer to perform procedures or methods that the captured image acquiring unit 2, the occupant identification unit 3, the object identification unit 5, the object owner determining unit 7, the object misplacement determining unit 9, and the object owner changing unit 13 perform.

Here, the processor 101 is a central processing unit (CPU), a processing device, an arithmetic device, a microprocessor, or the like.

The memory 102 may be a non-volatile or volatile semiconductor memory such as a random access memory (RAM), a read only memory (ROM), an erasable programmable ROM (EPROM), or a flash memory, may be a magnetic disc such as a hard disc or a flexible disc, or may be an optical disc such as a compact disc (CD) or a digital versatile disc (DVD).

A part of the functions of the captured image acquiring unit 2, the occupant identification unit 3, the object identification unit 5, the object owner determining unit 7, the object misplacement determining unit 9, and the object owner changing unit 13 may be implemented by hardware for exclusive use, and the other part of the functions may be implemented by software or firmware. As such, the processing circuit in the vehicle interior monitoring device 1 can implement each of the above functions by using hardware, software, firmware, or a combination of hardware, software, and firmware.

It is to be understood that any combination of two or more of the embodiments can be made, various modifications can be made in any component according to any one of the embodiments, or any component according to any one of the embodiments can be omitted within the scope of the present disclosure.

INDUSTRIAL APPLICABILITY

Since the vehicle interior monitoring device according to the present disclosure provides a warning of the misplacement of an object owned by an occupant when the occupant gets out, the vehicle interior monitoring device is suitable for use in a monitoring device or the like that provides a warning of the misplacement of an occupant's object not only in vehicles, but also in railway cars, ships, airplanes, or the likes.

REFERENCE SIGNS LIST 1 vehicle interior monitoring device, 2 captured image acquiring unit, 3 occupant identification unit, 4 occupant identification information storage unit, 5 object identification unit, 6 object identification information storage unit, 7 object owner determining unit, 8 object owner information storage unit, 9 object misplacement determining unit, 10 warning unit, 11 sound output unit, 12 display unit, 13 object owner changing unit, 21 owner image of occupant who has got out, 22 object image of misplaced object, 23 message, 24 close button, 31 owner image of occupant A, 32 owner image of occupant B, 33 owner image of occupant A, 34 owner image of occupant C, 35 object image of object O, 36 object image of object P, 37 object image of object Q, 38 object image of object R, 39, 41 pointer, 40 occupants image list, 42 owner image of occupant C, 100 processing circuit, 101 processor, 102 memory, 111 speaker, and 112 display.

The invention claimed is:

1. A vehicle interior monitoring device comprising processing circuitry
to acquire a captured image that is generated by capturing an image of an interior of a vehicle,
to detect getting in and getting out of a vehicle of each of occupants using the captured image, and generate occupant identification information by identifying each of the occupants who has got in as an identified occupant,
to detect presence or absence of an object using the captured image, and generate object identification information by identifying an object detected to be present as an identified object,
to generate object owner information by determining an owner of the identified object, out of the occupants, using the occupant identification information and the object identification information,
to determine, when getting out of an occupant is detected, whether or not an object owned by the occupant who gets out is misplaced in the vehicle using the object owner information about the occupant who gets out, and
to provide a warning when an object owned by the occupant who gets out is determined to be misplaced in the vehicle.

2. The vehicle interior monitoring device according to claim 1, wherein the occupant identification information is generated to include a seat position of the identified occupant,
the object identification information is generated to include a location of the identified object, and
the owner of an object is determined on a basis of a relation between the seat position included in the occupant identification information and the location included in the object identification information.

3. The vehicle interior monitoring device according to claim 2, wherein the owner of an object is determined using information in which a relation between the location of an object and a priority of a seat position having a high possibility that the owner of an object is present is defined.

4. The vehicle interior monitoring device according to claim 2, wherein the seat position included in the occupant identification information is coordinate values of the identified occupant in a three-dimensional coordinate system and the location included in the object identification information is coordinate values of the identified object in the three-dimensional coordinate system, and
an occupant at coordinate values closest to the coordinate values of an object in the three-dimensional coordinate system is determined to be the owner of the object.

5. The vehicle interior monitoring device according to claim 1, wherein the processing circuitry further performs processing to change a correspondence between an object included in the object owner information and an occupant who is an owner of the object on a basis of information inputted from an outside.

6. The vehicle interior monitoring device according to claim 1, wherein the occupant identification information is generated to include the captured image of the identified occupant,
the object identification information is generated to include the captured image of the identified object, and
when that an object owned by the occupant who gets out is determined to be misplaced in the vehicle, the captured image of the occupant who gets out and the captured image of the object are displayed.

7. A vehicle interior monitoring method comprising the steps of:
acquiring a captured image that is generated by capturing an image of an interior of a vehicle;
detecting getting in and getting out of a vehicle of each of occupants using the captured image, and generating occupant identification information by identifying each of the occupants who has got in as an identified occupant;
detecting presence or absence of an object using the captured image, and generating object identification information by identifying an object detected to be present as an identified object;
generating object owner information by determining an owner of the identified object, out of the occupants, using the occupant identification information and the object identification information;

determining, when getting out of an occupant is detected, whether or not an object owned by the occupant who gets out is misplaced in the vehicle using the object owner information about the occupant who gets out; and providing a warning when an object owned by the occupant who gets out is determined to be misplaced in the vehicle.

8. A vehicle interior monitoring device comprising processing circuitry to acquire a captured image that is generated by capturing an image of an interior of a vehicle, to detect getting in and getting out of a vehicle of each of occupants using the captured image, and generate occupant identification information by identifying each of the occupants who has got in as an identified occupant, to track a state of each identified occupant in the occupant identification information, the tracked state being switched to a getting-out state when the corresponding occupant is detected as being in the process of getting out of the vehicle;

to detect presence or absence of an object using the captured image, and generate object identification information by identifying an object detected to be present as an identified object, to generate object owner information by determining an owner of the identified object, out of the occupants, using the occupant identification information and the object identification information, the determined owner being one of the detected occupants whose tracked state has not yet been switched to a getting-out state, to determine, when an occupant is detected as being in the process of getting out of the vehicle, whether or not an object owned by the occupant who gets out is misplaced in the vehicle using the object owner information about the occupant who gets out, and to provide a warning when an object owned by the occupant who is getting out is determined to be misplaced in the vehicle.

* * * * *